E. G. & M. M. PEARLMAN.
APPARATUS FOR RECOVERING ZINC COMPOUNDS AND AMMONIA.
APPLICATION FILED OCT. 6, 1908.
919,376. Patented Apr. 27, 1909.
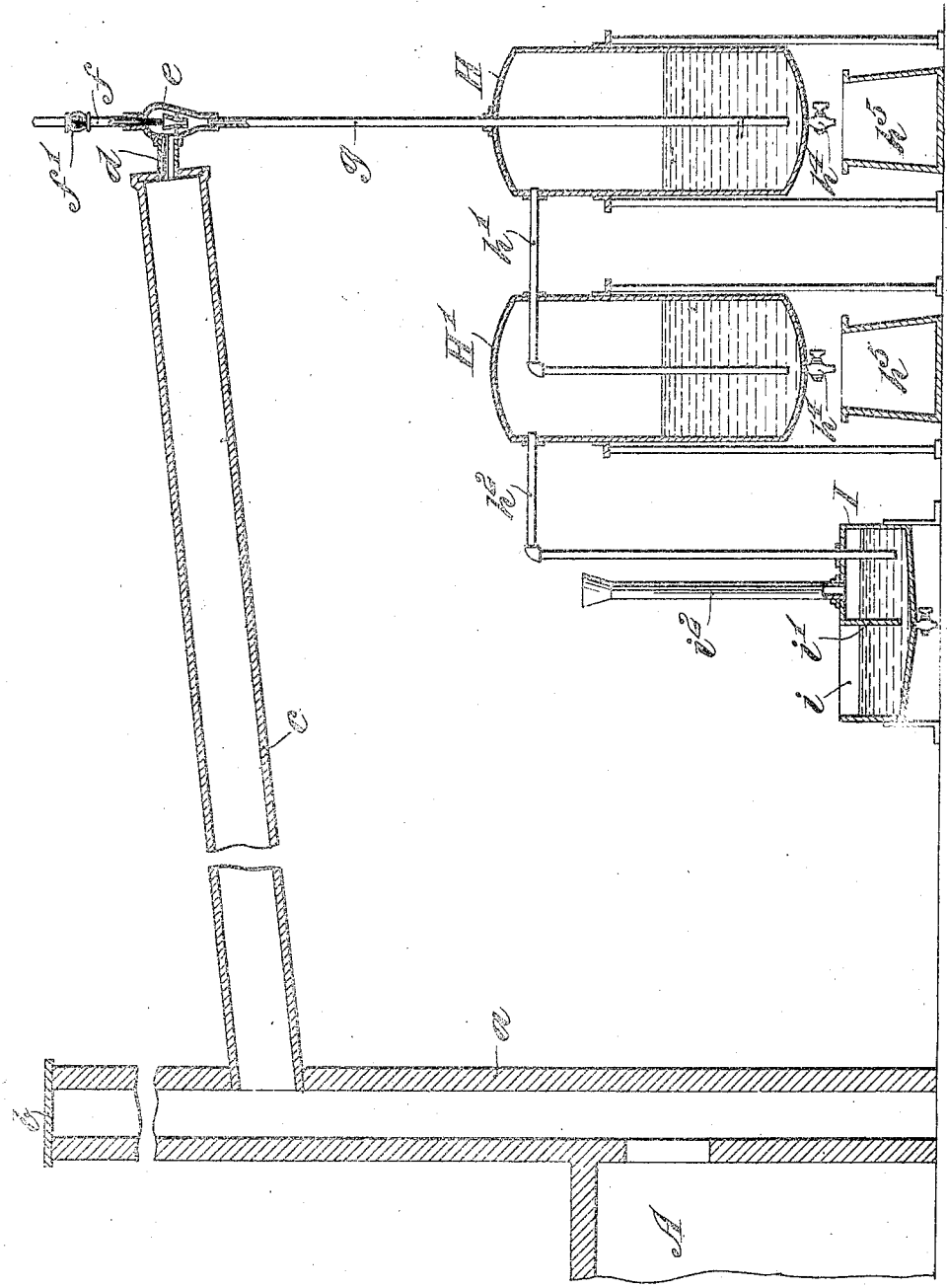

UNITED STATES PATENT OFFICE.

ELIAS G. PEARLMAN AND MARTIN M. PEARLMAN, OF PHILADELPHIA, PENNSYLVANIA.

APPARATUS FOR RECOVERING ZINC COMPOUNDS AND AMMONIA.

No. 919,376.   Specification of Letters Patent.   Patented April 27, 1909.

Application filed October 6, 1908. Serial No. 456,429.

*To all whom it may concern:*

Be it known that we, ELIAS G. PEARLMAN and MARTIN M. PEARLMAN, both citizens of the United States, residing at the city of Philadelphia, in the county of Philadelphia and State of Pennsylvania, have jointly invented certain new and useful Improvements in Apparatus for Recovering Zinc Compounds and Ammonia, of which the following is a specification.

Our invention relates to an apparatus for recovering zinc compounds and ammonia, resulting from conserving in the roasting or smelting of sal-ammoniac fluxes, by-products of the galvanizing process, the noxious ammonia gas and zinc chlorid fumes given off, which are not only exceedingly pungent or offensive in nature, but if freed into the atmosphere are very objectionable, as well as prejudicial to the health of communities. The said valuable gas and fumes it has been found can be utilized by certain treatments to produce commercial products, as sulfate of ammonia and as zinc-hydrate or zinc-oxyhydrate. The methods of treatment of such gas and fumes for the production of the aforesaid products, form the subject-matter of an application for Letters Patent filed by us, under date of October 3d, A. D. 1908, under the Serial No. 455,948.

The defined pungent or noxious gas and fumes exist in the said sal-ammoniac fluxes or skimmings, in varying proportions; and it is the principal object of our invention, to first provide an apparatus in which the said gas and fumes are economically and efficiently conserved by reducing to commercial conditions, respectively, of sulfate of ammonia and zinc oxy-hydrate; and to second provide an apparatus in which escape of said valuable gas and fumes into the atmosphere is prevented during roasting or smelting of the said sal-ammoniac fluxes, as hitherto by the practiced methods of roasting or smelting the same, and giving off more or less large proportions of said gas and fumes, and which were liberated into the atmosphere to the annoyance of communities due to their poisonous nature and effect upon the throat and lungs.

The nature and scope of our present invention will be more fully understood from the following description taken in connection with the accompanying drawing, illustrating diagrammatically an apparatus embodying main features of our said invention.

Referring to the drawing:—A, is an ordinary roasting or smelting furnace, in which is adapted to be introduced a batch of sal-ammoniac fluxes or skimmings, by-products of the galvanizing process, in the manufacture of spelter. The said furnace is provided with a stack $a$, which is closed at the top $b$. In the side of the stack is provided an opening, in which is introduced a terra-cotta or other suitable conduit $c$. This conduit may be exteriorly covered with asbestos or other material to protect the same against weather conditions. The forward end of the conduit $c$, is closed and provided with a pipe $d$, extending therefrom into a chambered injector device $e$, preferably of the Schutte-Korting type, for injecting in jet-like form, steam therethrough. A supply pipe $f$, is arranged so as to be connected with the device $e$, and is provided with a cut-off valve $f^1$. From the device $e$, extends downward a pipe $g$, into a vertical closed vessel H, and from which vessel extends a pipe $h^1$, into a similar vessel $H^1$.

In the vessels H and $H^1$, respectively, if used in connected series, are placed solutions of quick-lime or calcium hydrate which are agitated by the steam introduced through the pipe $h^1$, along with the ammonia gas and zinc chlorid fumes from the conduit $c$, of the roasting or smelting furnace A, conveyed thereinto and by such combined actions upon the said gas and fumes in each of the vessels H and $H^1$, is produced therein volatilized chlorid of zinc and volatilized ammonium chlorid or sal-ammoniac due to the saturated solution of calcium-hydrate or quick-lime therewith, in each of the said agitated solutions of the said vessels H and $H^1$.

Through the chlorid of zinc reacting with the calcium hydrate therein is produced the following reaction:

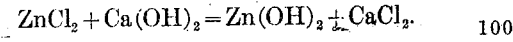

$$ZnCl_2 + Ca(OH)_2 = Zn(OH)_2 + CaCl_2.$$

The zinc-hydrate formed being a solid remains in the vessel H or $H^1$, or both connected vessels, with the excess of quick-lime. The calcium chlorid also formed being a solid, remains therein, but in a deliquescent state.

Through the sal-ammoniac or ammonium chlorid, reacting with the calcium-hydrate in the vessel H or $H^1$, or both connected vessels, occurs the following reaction:

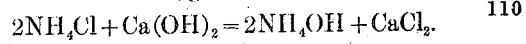

$$2NH_4Cl + Ca(OH)_2 = 2NH_4OH + CaCl_2.$$

As, in the above instance, the calcium chlorid will remain as a salt in the vessel H. The ammonia formed by the above reaction (NH₄OH) is a gas and will pass on into the next vessel H¹, wherein it fails to undergo any change, as the contents of the vessel H¹, is the same as that of the vessel H, namely calcium-hydrate. The action in the second vessel H¹, serves merely as a safeguard against any incomplete reactions in the first vessel H, and thus preventing waste of the property of a valuable product to be conserved and utilized under conditions, as above defined.

The ammonia gas as above then passes on through a pipe $h^2$, into a tank I, partly open at $i$, and having a depending roof or dome $i^1$, extending down into a suitable solution of this tank, preferably, consisting of dilute sulfuric acid, for converting readily the ammonia gas of the solution into sulfate of ammonia, as a commercial product. Such reaction taking place is as follows:—

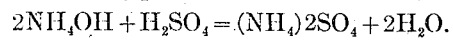

$$2NH_4OH + H_2SO_4 = (NH_4)2SO_4 + 2H_2O.$$

The ammonium sulfate thus formed is a solid and the other formation therein is water. Both of the foregoing commercial products thus obtained being derived in the described manner from the making of the main product spelter by the roasting or smelting of sal-ammoniac fluxes or skimmings and as will be readily understood, other chemical by-products from the recovery of ammonia gas and zinc chlorid fumes may be obtained, if mixed with other solutions than those hereinbefore described.

The tank I, is provided with an escape pipe $i^2$, through which any non-pungent vapors may escape into the atmosphere, after completion of the foregoing operations. By the series of treatments hereinabove described, it will be found as extended practice has demonstrated, that the ammonia gas and chlorid fumes arising from the treatment of the principal material are not fully conserved and utilized, but any vapors liberated into the atmosphere, will be odorless and unobjectionable.

In the bottom of each of the vessels H and H¹, are provided plug valves $h^4$, by the operation thereof, permitting the freeing of the zinc hydrate or zinc oxy-hydrate recovered, into carboys or other receptacles $h^5$, for use.

We claim:—

1. In an apparatus of the character described, a roasting or smelting furnace having a stack with a closed top and side conduit, a vessel for containing a solution, pipe connections from said conduit with said vessel, said pipe connections extending into and from said vessel to a tank having an escape-pipe, and an injector device connected with the pipe connections from said conduit with said vessel, substantially as and for the purposes described.

2. In an apparatus of the character described, a roasting or smelting furnace having a stack with a closed top and side conduit, pipe connections with said conduit and a vessel, an injector-device in said pipe connections from said conduit with said vessel, an open tank having a dome and an escape-pipe, said vessel and tank arranged to contain, respectively, different solutions for treating zinc chlorid fumes and ammonia gas therein from said furnace, substantially as and for the purposes described.

3. In an apparatus of the character described, a roasting or smelting furnace having a stack with a closed top and a side conduit, vertically arranged vessels in connected series, pipe connections from said conduit with one of said connected vessels, an injector-device located in the pipe connections between said conduit and one of said vessels, an outlet from the last of said vessels to an open tank having a dome and an escape-pipe, said connected vessels and tank adapted to contain, respectively, different solutions for receiving zinc chlorid fumes and ammonia gas from said roasting furnace, said connected vessels provided with means to permit of discharge of the recovered product and said tank arranged to permit of not only escape of non-pungent vapors but the recovery of the by-product of said tank, substantially as and for the purposes described.

In witness whereof, we have hereunto set our signatures in the presence of two subscribing witnesses.

ELIAS G. PEARLMAN.
MARTIN M. PEARLMAN.

Witnesses:
J. WALTER DOUGLASS,
THOMAS M. SMITH.